US009526079B1

(12) United States Patent
Shih et al.

(10) Patent No.: US 9,526,079 B1
(45) Date of Patent: Dec. 20, 2016

(54) SENSING APPARATUS, TIME ALIGNMENT APPARATUS, TIME PROCESSING METHOD, AND TIME ALIGNMENT METHOD

(71) Applicant: Institute For Information Industry, Taipei (TW)

(72) Inventors: Chi-Sheng Shih, Taipei (TW); Yen-Chieh Cheng, Taipei (TW); Chang Min Yang, Keelung (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/951,824

(22) Filed: Nov. 25, 2015

(30) Foreign Application Priority Data

Nov. 2, 2015 (TW) .............................. 104136014 A

(51) Int. Cl.
*H04W 56/00* (2009.01)
*H04W 4/00* (2009.01)

(52) U.S. Cl.
CPC ........... *H04W 56/001* (2013.01); *H04W 4/005* (2013.01)

(58) Field of Classification Search
USPC .................. 375/358, 376, 354; 713/400, 401
See application file for complete search history.

(56) References Cited

U.S. PATENT DOCUMENTS

| 2004/0047441 | A1* | 3/2004 | Gauthier | ................... H03L 7/07 375/376 |
| 2009/0204843 | A1* | 8/2009 | Celinski | .................... G06F 1/12 713/400 |
| 2011/0185215 | A1* | 7/2011 | Neben | ....................... G06F 1/12 713/401 |
| 2012/0170905 | A1* | 7/2012 | Brundula | ............... H04N 5/765 386/239 |
| 2015/0242346 | A1* | 8/2015 | Fujii | ....................... G06F 13/24 710/262 |

* cited by examiner

Primary Examiner — Eva Puente
(74) Attorney, Agent, or Firm — Skaar Ulbrich Macari, P.A.

(57) ABSTRACT

A sensor, a time alignment apparatus, a time processing method, and a time alignment method are provided. The sensor begins to sense at least one sensed data at a first local time instant. The sensor transmits a response message at a second local time instant. The response message carries the at least one sensed data, the first local time instant, and the second local time instant. The time alignment apparatus receives the response message at a first global time instant. The time alignment apparatus calculates a second global time instant that the at least one sensed data being sensed according to a required transmission time between the time alignment apparatus and the sensing apparatus, a clock skew rate between the time alignment apparatus and the sensing apparatus, the first global time instant, the first local time instant, and the second local time instant.

24 Claims, 10 Drawing Sheets

SENSING APPARATUS, TIME ALIGNMENT APPARATUS, TIME PROCESSING METHOD, AND TIME ALIGNMENT METHOD

PRIORITY

This application claims priority to Taiwan Patent Application No. 104136014 filed on Nov. 2, 2015, which is hereby incorporated by reference in its entirety.

FIELD

The present invention relates to a sensing apparatus, a time alignment apparatus, a time processing method, and a time alignment method. More particularly, the present invention relates to a sensing apparatus, a time alignment apparatus, a time processing method, and a time alignment method that calculate the time of sensed data.

BACKGROUND

With the rapid development of wireless communication and micro-electromechanical technologies in recent years, wireless sensing networks have found wide applications in various different fields. In a wireless sensing network, sensing apparatuses distributed over the sensing network are responsible for collecting various data (e.g., the occurrence of events, environment data being sensed periodically, etc.), while a main control apparatus analyzes the data collected by the sensing apparatuses. Since the time instant that the data is collected/sensed by the sensing apparatus tends to have a major influence on the result of the analysis, it is crucial whether the main control apparatus can obtain the correct time instant that the data is sensed.

In conventional wireless sensing networks, the main control apparatus obtains the correct time instant that the data is sensed mainly in three ways. In the first way, the sensing apparatuses are connected to the Internet to obtain accurate time instants via the network time protocol and then synchronize time with the main control apparatus. However, the main control apparatus is vulnerable to the Distributed Denial of Service (DDoS) attack if the first way is adopted. The second way is to configure a Global Positioning System (GPS) module inside the sensing apparatuses, and the third way is to configure a time synchronization chip inside the sensing apparatuses. However, the sensing apparatuses will become oversized in volume and have a high cost no matter whether the second or the third way is adopted.

Accordingly, an urgent need exists in the technical field of wireless sensing networks to provide a time alignment mechanism, through which the sensing apparatuses will not have a high cost and will not become oversized and the main control apparatus will not be vulnerable to the network attack.

SUMMARY

The disclosure includes a sensing apparatus, a time alignment apparatus, a time processing method, and a time alignment method.

A sensing apparatus in certain embodiments can include a counter, a transceiving interface, and a sensor, wherein the sensor and the counter are electrically connected to the transceiving interface. The transceiving interface receives a request signal from a time alignment apparatus. The sensor begins to sense at least one sensed data at a first local time instant defined by the counter. The transceiving interface further transmits a response message to the time alignment apparatus at a second local time instant defined by the counter according to the request signal. The response message carries the at least one sensed data, the first local time instant, and the second local time instant so that the time alignment apparatus calculates a global time instant that the at least one sensed data is sensed according to the first local time instant and the second local time instant.

A time alignment apparatus in certain embodiments can include a real-time clock, a transceiving interface, and a processor, wherein the processor is electrically connected to the transceiving interface. The transceiving interface transmits a request signal to a sensing apparatus and receives a response message from the sensing apparatus at a first global time instant defined by the real-time clock. The response message carries at least one sensed data, a first local time instant, and a second local time instant, wherein the sensing apparatus senses the at least one sensed data at the first local time instant and the sensing apparatus transmits the first response message at the second local time instant. The processor calculates a second global time instant that the at least one sensed data is sensed by the sensing apparatus according to a required transmission time between the time alignment apparatus and the sensing apparatus, a clock skew rate between the time alignment apparatus and the sensing apparatus, the first global time instant, the first local time instant, and the second local time instant.

A time processing method can be adapted for a sensing apparatus, wherein the sensing apparatus comprises a counter, a transceiving interface, and a sensor. The time processing method can include the following steps of: (a) receiving, by the transceiving interface, a request signal from a time alignment apparatus, (b) beginning to sense, by the sensor, at least one sensed data at a first local time instant defined by the counter, and (c) transmitting, by the transceiving interface, a response message to the time alignment apparatus according to the request signal at a second local time instant defined by the counter. The response message carries the at least one sensed data, the first local time instant, and the second local time instant so that the time alignment apparatus calculates a global time instant that the at least one sensed data is sensed according to the first local time instant and the second local time instant.

A time alignment method can be adapted for a time alignment apparatus, wherein the time alignment apparatus comprises a real-time clock, a transceiving interface, and a processor. The time alignment method can include the following steps of: (a) transmitting, by the transceiving interface, a request signal to a sensing apparatus, (b) receiving, by the transceiving interface, a response message from the sensing apparatus at a first global time instant defined by the real-time clock, wherein the response message carries at least one sensed data, a first local time instant, and a second local time instant, and (c) calculating, by the processor, a second global time instant that the at least one sensed data is sensed by the sensing apparatus according to a required transmission time between the time alignment apparatus and the sensing apparatus, a clock skew rate between the time alignment apparatus and the sensing apparatus, the first global time instant, the first local time instant, and the second local time instant.

According to certain disclosed embodiments, the sensing apparatus will transmit a response message to the time alignment apparatus after receiving a request signal transmitted by the time alignment apparatus. The response message transmitted by the sensing apparatus comprises at least the following information: (a) at least one sensed data, (b)

the local time instant that the sensing apparatus begins to sense the at least one sensed data, and (c) the local time instant that the sensing apparatus transmits the response message. After obtaining the at least one sensed data carried by the response message, the time alignment apparatus needs to perform time alignment on the at least one sensed data. In other words, the time alignment apparatus needs to align the local time instant (which is the time instant recognizable by the sensing apparatus) that the at least one sensed data is sensed into a global time instant (which is the time instant recognizable by the time alignment apparatus). In particular, the time alignment apparatus aligns the time of the at least one sensed data according to the following five information: (a) a required transmission time between the time alignment apparatus and the sensing apparatus, (b) a clock skew rate between the time alignment apparatus and the sensing apparatus, (c) the global time instant that the response message is received by the time alignment apparatus, (d) the local time instant that the sensing apparatus begins to sense the at least one sensed data and (e) the local time instant that the sensing apparatus transmits the response message.

The aforesaid local time instant can be defined by the counter included in the sensing apparatus. If the sensing apparatus comprises a Microcontroller Unit (MCU), the counter of the MCU may be used as the counter for defining the local time instant. The cost of a counter is much lower than that of a GPS module and a time synchronization chip used in the conventional technology. In addition, the volume of a counter is much smaller than that of a GPS module and a time synchronization chip used in the conventional technology. Therefore, deploying sensing apparatus(es) of a sensing network will not be a burden to users. Moreover, the technology provided in the present invention does not adopt the network time protocol to obtain the accurate time instant, so there is no risk of being attacked by the DDoS.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the sensing apparatus, the time alignment apparatus, the time processing method, and the time alignment method according to the present invention will be explained with reference to example embodiments thereof. However, these example embodiments are not intended to limit the present invention to any particular examples, embodiments, environment, applications, or implementations described in these example embodiments. Therefore, description of these example embodiments is only for purpose of illustration rather than to limit the present invention. It shall be appreciated that, in the following embodiments and the attached drawings, elements unrelated to the present invention are omitted from depiction.

Figure 1A:
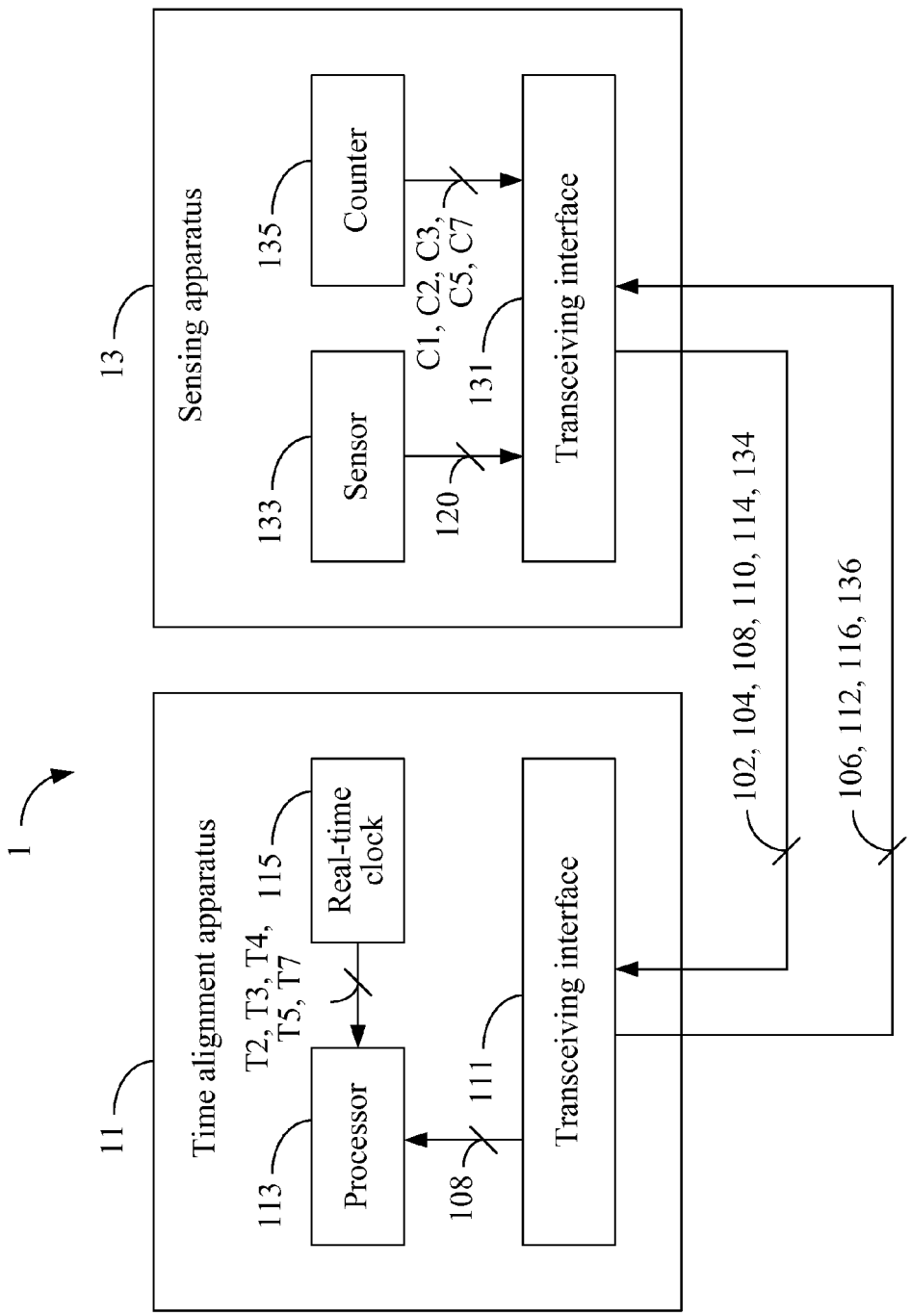
FIG. 1A is a schematic view of a sensing network 1 of a first embodiment.

A first embodiment of the present invention is a sensing network 1 and a schematic view of which is depicted in FIG. 1A. The sensing network 1 comprises a time alignment apparatus 11 and a plurality of sensing apparatuses. Since the sensing apparatuses operate similarly in terms of transmitting sensed data and relevant time information (which will be described later in detail) to the time alignment apparatus 11, only one sensing apparatus (i.e., a sensing apparatus 13) is depicted in FIG. 1 as a representative. How other sensing apparatuses operate in cooperation with the time alignment apparatus 11 shall be readily appreciated by those of ordinary skill in the art according to the following description of the sensing apparatus 13.

The time alignment apparatus 11 comprises a transceiving interface 111, a processor 113, and a real-time clock 115. The transceiving interface 111 may be any interface that is capable of communicating with the sensing apparatus 13 in order to transmit data and/or signals, e.g., a Near Field Communication (NFC) interface, a Bluetooth interface, a Radio Frequency Identification (RFID) interface, a Wi-Fi interface, or the like. The processor 113 may be any of various processors, central processing units (CPUs), microprocessors, or other computing apparatuses known to those of ordinary skill in the art. The real-time clock 115 may be any kind of chip, electronic element, or electronic equipment that can output actual time. The time alignment apparatus 11 adopts the actual time outputted from the real-time clock 115 as the global time instant that it uses.

The sensing apparatus 13 comprises a transceiving interface 131, a sensor 133, and a counter 135. The transceiving interface 131 may be any interface that is capable of communicating with the time alignment apparatus 11 in order to transmit data and/or signals, e.g., an NFC interface, a Bluetooth interface, an RFID interface, a Wi-Fi interface, or the like. The sensor 133 may be any element that is capable of sensing events and/or collecting data, e.g., a pressure sensor, a temperature sensor, a humidity sensor, a displacement sensor, and an illumination sensor. The counter 135 may be any register that is capable of timing or counting. The counter 135 accumulate its value every preset time interval and the accumulated value is used by the sensing apparatus 13 as the local time instant. After the accumulated value has reached the maximum value allowed by the counter 135, the accumulated value is reset to 0 and re-accumulate again. The operation manner and principle of the counter 135 shall be well known to those of ordinary skill in the art; hence, the details are not described herein. In some embodiments, if a sensing apparatus comprises a Microcontroller Unit (MCU), the counter of the MCU may be used as the counter of the sensing apparatus.

Figure 1B:
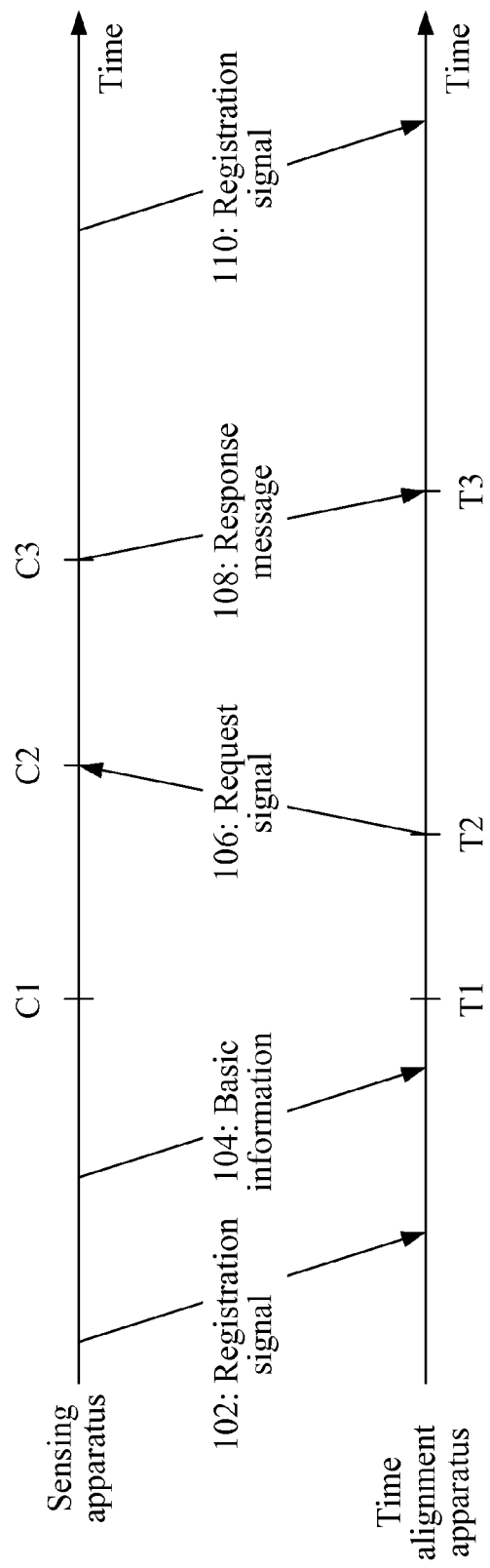
FIG. 1B is a time diagram of a time alignment apparatus 11 and a sensing apparatus 13 of the first embodiment.

Please refer to FIG. 1B as well, which is a time diagram of the time alignment apparatus 11 and the sensing apparatus 13 of this embodiment. In this embodiment, the transceiving interface 131 of the sensing apparatus 13 transmits a registration signal 102 to the time alignment apparatus 11 in order to be registered to the time alignment apparatus 11. The receiving interface 111 of the time alignment apparatus 11 receives the registration signal 102 transmitted by the sensing apparatus 13. Thereafter, the transceiving interface 131 of the sensing apparatus 13 transmits a piece of basic information 104 to the time alignment apparatus 11. The piece of basic information 104 carries a data transmission quantity, a counter parameter (e.g., the number of bits of the counter 135), and/or a maximum transmission update frequency. The receiving interface 111 of the time alignment apparatus 11 receives the basic information 104 transmitted by the sensing apparatus 13. It shall be appreciated that if the sensing apparatus 13 has been registered to the time alignment apparatus 11 (e.g., being pre-registered during the procedure of deploying the sensing network 1) in other embodiments, it is unnecessary for the sensing apparatus 13 to transmit the registration signal 102. Moreover, in other embodiments, if the time alignment apparatus 11 already has the basic information of the sensing apparatus 13 (e.g., the aforesaid data transmission quantity, the parameter of the counter 135, and/or the maximum transmission update frequency), it is unnecessary for the sensing apparatus 13 to transmit the basic information 104.

In this embodiment, the sensor 133 of the sensing apparatus 13 begins to sense at least one sensed data 120 at a local time instant C1 defined by the counter 135. The transceiving interface 111 of the time alignment apparatus 11 transmits a request signal 106 to the sensing apparatus 13 at a global time instant T2 defined by the real-time clock 115. The request signal 106 is used for requesting the sensing apparatus 13 to transmit the sensed data 120 that has been sensed by the sensing apparatus 13. It shall be appreciated that the time alignment apparatus 11 is able to infer the time that the sensing apparatus 13 begins to sense one or a batch of sensed data and the time that the sensing apparatus 13 stops sensing the (batch of) sensed data because the time alignment apparatus 11 has the basic information of the sensing apparatus 13 (e.g., the aforesaid data transmission quantity, the counter parameter, and/or the transmission update frequency). Therefore, in some embodiments, the global time instant T2 for transmitting the aforesaid request signal 106 is decided by the processor 113 of the time alignment apparatus 11 according to the basic information of the sensing apparatus 13.

The transceiving interface 131 of the sensing apparatus 13 receives the request signal 106 transmitted by the time alignment apparatus 11 at a local time instant C2 defined by the counter 135. After receiving the request signal 106, the transceiving interface 131 of the sensing apparatus 13 transmits a response message 108 to the time alignment apparatus 11 at a local time instant C3 defined by the counter 135 in response. The response message 108 carries the sensed data 120, the local time instant that the sensor 133 begins to sense the sensed data 120 (i.e., the local time instant C1), and the local time instant that the transceiving interface 131 transmits the response message 108 (i.e., the local time instant C3). In some embodiments, the local time instant that the sensing apparatus 13 transmits the response message 108 is decided by the time alignment apparatus 11. Specifically, the request signal 106 transmitted by the time alignment apparatus 11 carries a time offset (not shown) and the transceiving interface 131 of the sensing apparatus 13 transmits the response message 108 to the time alignment apparatus 11 at the local time instant C3 according to the local time instant that the request signal 106 is received (i.e., the local time instant C2) and the time offset. For example, if the value of the time offset is 2, it means that the time alignment apparatus 11 designates the sensing apparatus 13 to transmit the response message 108 at the local time instant that is two counts after the local time instant that the request signal 106 is received.

As described above, the response message 108 transmitted by the sensing apparatus 13 carries the sensed data 120, the local time instant that the sensor 133 begins to sense the sensed data 120 (i.e., the local time instant C1), and the local time instant that the transceiving interface 131 transmits the response message 108 (i.e., the local time instant C3). The transceiving interface 111 of the time alignment apparatus 11 receives the response message 108 from the sensing apparatus 13 at a global time instant T3 defined by the real-time clock 115. After obtaining the sensed data 120 carried by the response message 108, the time alignment apparatus 11 needs to calculate the global time instant that the sensed data 120 is sensed so that the subsequent records and/or analysis will be correct. Specifically, the processor 113 of the time alignment apparatus 11 calculates a global time instant T1 that the at least one sensed data is sensed by the sensing apparatus 13 according to a required transmission time between the time alignment apparatus 11 and the sensing apparatus 13, a clock skew rate between the time alignment apparatus 11 and the sensing apparatus 13, the global time instant that the response message 108 is received by the time alignment apparatus 11 (i.e., the global time instant T3), the local time instant that the sensor 133 begins to sense the sensed data 120 (i.e., the local time instant C1), and the local time instant that the transceiving interface 131 transmits the response message 108 (i.e., the local time instant C3). For example, the processor 113 of the time alignment apparatus 11 may calculate the global time instant T1 according to the following Equation (1):

$$T_1 = T_3 - D - (C_3 - C_1) \times R \qquad (1)$$

In the aforesaid Equation (1), the parameter $T_1$ represents the global time instant T1, the parameter $T_3$ represents the global time instant T3, the parameter D represents the required transmission time between the time alignment apparatus 11 and the sensing apparatus 13, the parameter $C_3$ represents the local time instant C3, the parameter $C_1$ represents the local time instant C1, and the parameter R represents the clock skew rate between the time alignment apparatus 11 and the sensing apparatus 13.

It shall be appreciated that, in some embodiments, the time alignment apparatus 11 may know the required transmission time between the time alignment apparatus 11 and the sensing apparatus 13 as well as the clock skew rate between the time alignment apparatus 11 and the sensing apparatus 13 in advance (e.g., the two pieces of information are recorded into the time alignment apparatus 11 during the procedure of deploying the sensing network 1). In some embodiments, the two pieces of information may be calculated by the time alignment apparatus 11 according to some local time instants and some global time instants. For ease of understanding, two examples of the calculation are given below.

In the first example, the response message 108 transmitted by the sensing apparatus 13 further carries the local time instant that the request signal 106 is received by the sensing apparatus 13 (i.e., the local time instant C2). The processor 113 of the time alignment apparatus 11 calculates the required transmission time between the time alignment apparatus 11 and the sensing apparatus 13 according to the global time instant that the response message 108 is received by the time alignment apparatus 11 (i.e., the global time instant T3), the global time instant that the time alignment apparatus 11 transmits the request signal 106 (i.e., the global time instant T2), the local time instant that the sensing apparatus 13 transmits the response message 108 (i.e., the local time instant C3), and the local time instant that the request signal 106 is received by the sensing apparatus 13 (i.e., the local time instant C2). For example, the processor 113 of the time alignment apparatus 11 may calculate the required transmission time between the time alignment apparatus 11 and the sensing apparatus 13 according to the following Equation (2):

$$D = \frac{((T_3 - T_2) - (C_3 - C_2))}{2} \quad (2)$$

In the aforesaid Equation (2), the parameter D represents the required transmission time between the time alignment apparatus 11 and the sensing apparatus 13, the parameter R represents the clock skew rate between the time alignment apparatus 11 and the sensing apparatus 13, the parameter $T_2$ represents the global time instant T2, the parameter $T_3$ represents the global time instant T3, the parameter $C_2$ represents the local time instant C2, and the parameter $C_3$ represents the local time instant C3.

Additionally, the processor 113 of the time alignment apparatus 11 may calculate the clock skew rate between the time alignment apparatus 11 and the sensing apparatus 13 according to the global time instant that the response message 108 is received by the time alignment apparatus 11 (i.e., the global time instant T3), the global time instant that the time alignment apparatus 11 transmits the request signal 106 (i.e., the global time instant T2), the local time instant that the sensing apparatus 13 transmits the response message 108 (i.e., the local time instant C3), the local time instant that the request signal 106 is received by the sensing apparatus 13 (i.e., the local time instant C2), and the required transmission time between the time alignment apparatus 11 and the sensing apparatus 13. For example, the processor 113 of the time alignment apparatus 11 may calculate the clock skew rate between the time alignment apparatus 11 and the sensing apparatus 13 according to the following Equation (3):

$$R = \frac{(T_3 - T_2 - 2D)}{(C_3 - C_2)} \quad (3)$$

In the aforesaid Equation (3), the parameter D represents the required transmission time between the time alignment apparatus 11 and the sensing apparatus 13, the parameter R represents the clock skew rate between the time alignment apparatus 11 and the sensing apparatus 13, the parameter $T_2$ represents the global time instant T2, the parameter $T_3$ represents the global time instant T3, the parameter $C_2$ represents the local time instant C2, and the parameter $C_3$ represents the local time instant C3.

In the second example, several sensed data that are sensed by the sensing apparatus 13 have been transmitted and received between the time alignment apparatus 11 and the sensing apparatus 13 through the aforesaid operations. Every time one (or a batch of) sensed data is transmitted and received, the time alignment apparatus 11 calculates the required transmission time between the time alignment apparatus 11 and the sensing apparatus 13 according to (a) the global time instant that a response message is received by the time alignment apparatus 11, (b) the global time instant that the time alignment apparatus 11 transmits a request signal, (c) the local time instant that the sensing apparatus 13 transmits the response message and (d) the local time instant that the request signal is received by the sensing apparatus 13. Every time one sensed data is transmitted and received, the time alignment apparatus 11 also calculates the clock skew rate between the time alignment apparatus 11 and the sensing apparatus 13 according to (a) the global time instant that a response message is received by the time alignment apparatus 11, (b) the global time instant that the time alignment apparatus 11 transmits a request signal, (c) the local time instant that the sensing apparatus 13 transmits the response message, (d) the local time instant that the request signal is received by the sensing apparatus 13, and (e) the required transmission time between the time alignment apparatus 11 and the sensing apparatus 13. The time alignment apparatus 11 may take an average of the values of the required transmission time between the time alignment apparatus 11 and the sensing apparatus 13 that are obtained through several times of calculation. Similarly, the time alignment apparatus 11 may take an average of the values of the clock skew rate between the time alignment apparatus 11 and the sensing apparatus 13 that are obtained through several times of calculation.

It shall be appreciated that the aforesaid two examples are only for illustration and are not intended to limit the scope of the present invention. According to the above descriptions, those of ordinary skill in the art shall appreciate that the required transmission time between the time alignment apparatus 11 and the sensing apparatus 13 as well as the clock skew rate between the time alignment apparatus 11 and the sensing apparatus 13 can be calculated in other ways in the present invention. As described above, the time alignment apparatus 11 can calculate the global time instant T1 that the sensed data 120 is sensed by the sensing apparatus 13 according to a required transmission time between the time alignment apparatus 11 and the sensing apparatus 13, a clock skew rate between the time alignment apparatus 11 and the sensing apparatus 13, the global time instant that the response message 108 is received by the time alignment apparatus 11, the local time instant that the sensor 133 begins to sense the sensed data 120, and the local time instant that the transceiving interface 131 transmits the response message 108.

In some embodiments, the sensing network 1 further provides a solution for handling disconnection. Specifically, after the sensing apparatus 13 is registered to the time alignment apparatus 11, the sensing apparatus 13 expects that the time alignment apparatus 11 would request the sensing apparatus 13 to transmit the sensed data (i.e., a request signal is expected). Thus, if the request signal transmitted by the time alignment apparatus 11 is not received by the sensing apparatus 13 over a first preset time duration (e.g., the counter 135 has performed the accumulation for a preset number of times), the sensing apparatus 13 believes that it has been disconnected from the time alignment apparatus 11 and, thus, transmits another registration signal 110.

In some embodiments, the sensing network 1 further provides two solutions for data loss and/or collision conditions, which are described below.

Figure 1C:
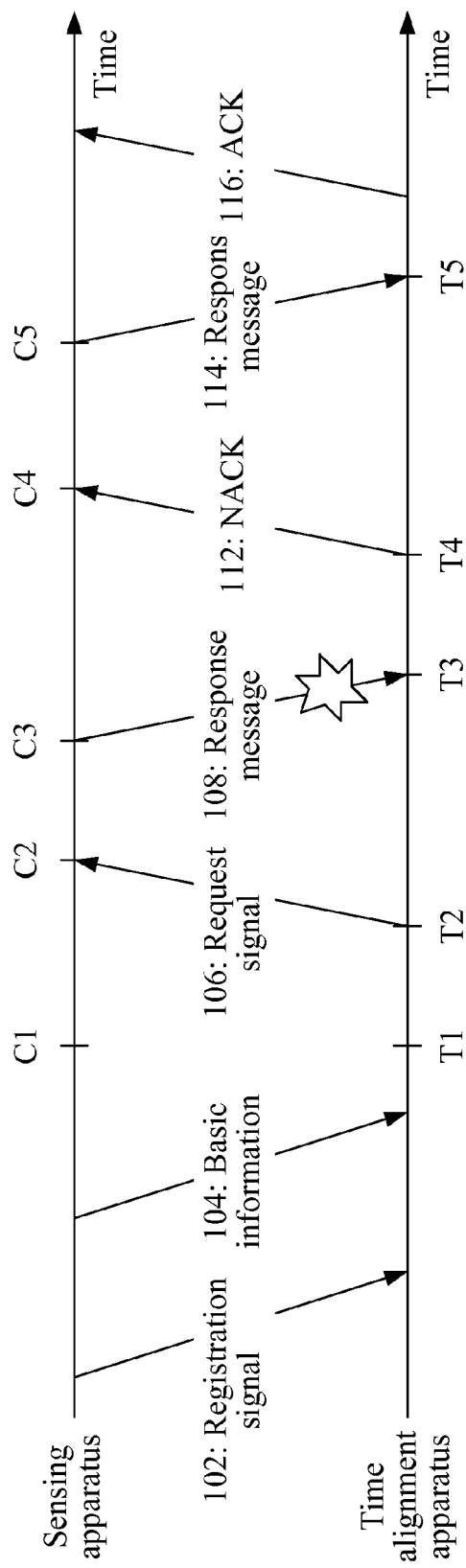
FIG. 1C depicts the first kind of data loss and/or collision condition and the solution thereof.

Please refer to FIG. 1C, which depicts the first type of data loss and/or collision condition (i.e., the response message 108 transmitted by the sensing apparatus 13 is not actually received by the time alignment apparatus 11) and the solution thereof. After transmitting the request signal 106 to the sensing apparatus 13, the time alignment apparatus 11 expects to receive a response message from the sensing apparatus 13. Thus, if the response message transmitted by the sensing apparatus 13 is not received by the time alignment apparatus 11 over a second preset time duration (e.g., several milliseconds), the transceiving interface 111 of the time alignment apparatus 11 transmits a Negative-Acknowledgment (NACK) 112 to the sensing apparatus 13 at a global time instant T4 defined by the real-time clock 115. The transceiving interface 131 of the sensing apparatus 13 receives the NACK 112 at a local time instant C4 defined by the counter 135. After receiving the NACK 112, the transceiving interface 131 of the sensing apparatus 13 further transmits another response message 114 to the time alignment apparatus 11 in response at a local time instant C5 defined by the counter 135.

It shall be appreciated that, in some embodiments, the NACK 112 carries a time offset (not shown), so the transceiving interface 131 of the sensing apparatus 13 may transmit the response message 114 to the time alignment apparatus 11 at the local time instant C5 according to the local time instant that the NACK 112 is received (i.e., the local time instant C4) and the time offset. The response message 114 transmitted by the sensing apparatus 13 carries the sensed data 120, the local time instant that the sensor 133 begins to sense the sensed data 120 (i.e., the local time instant C1), and the local time instant that the sensing apparatus 13 transmits the response message 114 (i.e., the local time instant C5). The transceiving interface 111 of the time alignment apparatus 11 receives the response message 114 at a global time instant T5 defined by the real-time clock 115. Thereafter, the processor 113 of the time alignment apparatus 11 calculates the global time instant T1 that the sensed data 120 is sensed according to the required transmission time between the time alignment apparatus 11 and the sensing apparatus 13, the clock skew rate between the time alignment apparatus 11 and the sensing apparatus 13, the global time instant that the response message 114 is received by the time alignment apparatus 11 (i.e., the global time instant T5), the local time instant that the sensor 133 begins to sense the sensed data 120 (i.e., the local time instant C1), and the local time instant that the sensing apparatus 13 transmits the response message 114 (i.e., the local time instant C5). For example, the processor 113 of the time alignment apparatus 11 may calculate the global time instant T1 according to the following Equation (4). It shall be appreciated that the principle of the Equation (4) is the same as that of the aforesaid Equation (1).

$$T_1 = T_5 - D - (C_5 - C_1) \times R \quad (4)$$

In the aforesaid Equation (4), the parameter $T_1$ represents the global time instant T1, the parameter $T_5$ represents the global time instant T5, the parameter D represents the required transmission time between the time alignment apparatus 11 and the sensing apparatus 13, the parameter $C_5$ represents the local time instant C5, the parameter $C_1$ represents the local time instant C1, and the parameter R represents the clock skew rate between the time alignment apparatus 11 and the sensing apparatus 13.

Likewise, if the response message 114 further carries the local time instant that the NACK 112 is received by the sensing apparatus 13 (i.e., the local time instant C4), the processor 113 of the time alignment apparatus 11 may calculate the required transmission time between the time alignment apparatus 11 and the sensing apparatus 13 according to the following Equation (5) (if necessary) and may calculate the clock skew rate between the time alignment apparatus 11 and the sensing apparatus 13 according to the following Equation (6) (if necessary). It shall be appreciated that the principles of the Equations (5) and (6) are the same as those of the aforesaid Equations (2) and (3) respectively.

$$D = \frac{((T_5 - T_4) - (C_5 - C_4))}{2} \quad (5)$$

$$R = \frac{(T_5 - T_4 - 2D)}{(C_5 - C_4)} \quad (6)$$

In the aforesaid Equations (5) and (6), the parameter D represents the required transmission time between the time alignment apparatus 11 and the sensing apparatus 13, the parameter R represents the clock skew rate between the time alignment apparatus 11 and the sensing apparatus 13, the parameter $T_4$ represents the global time instant T4, the parameter $T_5$ represents the global time instant T5, the parameter $C_4$ represents the local time instant C4, and the parameter $C_5$ represents the local time instant C5.

After receiving the response message 114, the transceiving interface 111 of the time alignment apparatus 11 transmits an Acknowledgment (ACK) 116 to the sensing apparatus 13. The transceiving interface 131 of the sensing apparatus 13 receives the ACK 116.

Figure 1D:
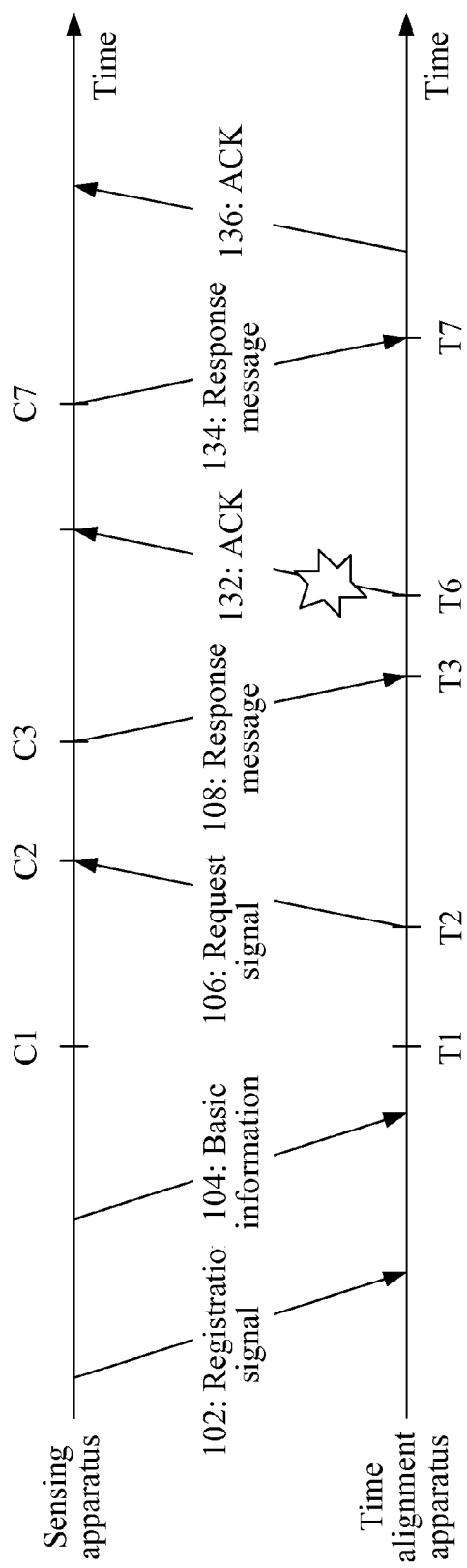
FIG. 1D depicts the second kind of data loss and/or collision condition and the solution thereof.

Please refer to FIG. 1D, which depicts the second type of data loss and/or collision condition (i.e., an ACK 132 transmitted by the time alignment apparatus 11 after receiving the response message 108 is not actually received by the sensing apparatus 13) and the solution thereof. As illustrated in FIG. 1D, the transceiving interface 111 of the time alignment apparatus 11 transmits an ACK 132 to the sensing apparatus 13 at a global time instant T6 defined by the real-time clock 115 after the time alignment apparatus 11 receives the response message 108. However, the ACK 132 is not actually received by the sensing apparatus 13. No ACK is received within a third preset time duration by the sensing apparatus 13 after the sensing apparatus 13 has transmitted the response message 108, the sensing apparatus 13 believes that the response message 108 is not received by the time alignment apparatus 11. Therefore, the transceiving interface 131 of the sensing apparatus 13 transmits another response message 134 to the time alignment apparatus 11 at a local time instant C7 defined by the counter 135, wherein the response message 134 carries the sensed data 120, the local time instant that the sensor 133 begins to sense the sensed data 120 (i.e., the local time instant C1), and the local time instant that the sensing apparatus 13 transmits the response message 134 (i.e., the local time instant C7).

The transceiving interface 111 of the time alignment apparatus 11 receives the response message 134 at a global time instant T7 defined by the real-time clock. Thereafter, the processor 113 of the time alignment apparatus 11 calculates the global time instant T1 that the sensed data 120 is sensed according to the required transmission time between the time alignment apparatus 11 and the sensing apparatus 13, the clock skew rate between the time alignment apparatus 11 and the sensing apparatus 13, the global time instant that the response message 134 is received by the time alignment apparatus 11 (i.e., the global time instant T7), the local time instant that the sensor 133 begins to sense the sensed data 120 (i.e., the local time instant C1), and the local time instant that the sensing apparatus 13 transmits the response message 134 (i.e., the local time instant C7). For example, the processor 113 of the time alignment apparatus 11 may calculate the global time instant T1 according to the following Equation (7). It shall be appreciated that the principle of the Equation (7) is the same as that of the aforesaid Equation (1).

$$T_1 = T_7 - D - (C_7 - C_1) \times R \quad (7)$$

In the aforesaid Equation (7), the parameter $T_1$ represents the global time instant T1, the parameter $T_7$ represents the global time instant T7, the parameter D represents the required transmission time between the time alignment apparatus 11 and the sensing apparatus 13, the parameter $C_7$ represents the local time instant C7, the parameter $C_1$ represents the local time instant C1, and the parameter R represents the clock skew rate between the time alignment apparatus 11 and the sensing apparatus 13.

Likewise, if the response message 134 further carries the local time instant that the request signal 106 is received by the sensing apparatus 13 (i.e., the local time instant C2), the processor 113 of the time alignment apparatus 11 may calculate the required transmission time between the time alignment apparatus 11 and the sensing apparatus 13 according to the following Equation (8) (if necessary) and may calculate the clock skew rate between the time alignment apparatus 11 and the sensing apparatus 13 according to the following Equation (9) (if necessary). It shall be appreciated that the principles of the Equations (8) and (9) are the same as those of the aforesaid Equations (2) and (3) respectively.

$$D = \frac{((T_7 - T_2) - (C_7 - C_2))}{2} \quad (8)$$

$$R = \frac{(T_7 - T_2 - 2D)}{(C_7 - C_2)} \quad (9)$$

In the aforesaid Equations (8) and (9), the parameter D represents the required transmission time between the time alignment apparatus 11 and the sensing apparatus 13, the parameter R represents the clock skew rate between the time alignment apparatus 11 and the sensing apparatus 13, the parameter $T_7$ represents the global time instant T7, the parameter $T_2$ represents the global time instant T2, the parameter $C_7$ represents the local time instant C7, and the parameter $C_2$ represents the local time instant C2.

Thereafter, the processor 113 of the time alignment apparatus 11 determines that the sensed data 120 carried by the response message 134 is the same as the sensed data 120 carried by the response message 108 and, thus, the processor 113 discards one of the sensed data 120. Furthermore, after receiving the response message 134, the transceiving interface 111 of the time alignment apparatus 11 transmits an ACK 136 to the sensing apparatus 13. The transceiving interface 131 of the sensing apparatus 13 receives the ACK 136.

As described above, the sensing network 1 comprises a plurality of sensing apparatuses. How the sensed data is transmitted and received between other sensing apparatuses and the time alignment apparatus 11 as well as how the time alignment apparatus 11 calculates the global time instants that the sensed data received from different sensing apparatuses are sensed shall be readily appreciated by those of ordinary skill in the art based on the above descriptions and, hence, will not be further described herein.

Additionally, since the time alignment apparatus 11 has the basic information of all the sensing apparatuses (e.g., the data transmission quantity, the counter parameter, and/or the maximum transmission update frequency), the time alignment apparatus 11 can schedule these sensing apparatuses according to these basic information. In other words, with these basic information, the time alignment apparatus 11 can decide when to transmit a request signal to which sensing apparatus for requesting the sensing apparatus to transmit the sensed data that is collected by the sensing apparatus. Moreover, when the bandwidth of the sensing network 1 varies, the time alignment apparatus 11 adjusts the time instant that the sensing apparatus transmits the sensed data by adjusting the time instant that the request signal is transmitted. Additionally, the sensing network 1 may also decide when to transmit a request signal to which sensing apparatus by taking the Quality of Service (QoS) of the sensing apparatuses and the importance of the sensed data into consideration.

Briefly speaking, in this embodiment, the sensing apparatus 13 transmits the following information to the time alignment apparatus 11: (a) at least one sensed data that is sensed by the sensing apparatus 13, (b) the local time instant that the sensing apparatus begins to sense the at least one sensed data, and (c) the local time instant that the sensing apparatus transmits the response message. Therefore, the time alignment apparatus 11 can calculate the global time instant that at least one sensed data is sensed according to the following information: (a) a required transmission time between the time alignment apparatus and the sensing apparatus, (b) a clock skew rate between the time alignment apparatus and the sensing apparatus, (c) the global time instant that the response message is received by the time alignment apparatus, (d) the local time instant that the sensing apparatus begins to sense the at least one sensed data, and (e) the local time instant that the sensing apparatus transmits the response message.

The aforesaid local time instant is defined by the counter 135 included in the sensing apparatus 13. The cost of the counter 135 is much lower than that of the GPS module and the time synchronization chip used in the conventional technology. In addition, the volume of the counter 135 is much smaller than that of the GPS module and the time synchronization chip used in the conventional technology. Therefore, building the sensing apparatus 13 of the sensing network 1 will not be a burden to the users. Moreover, the technology provided in the present invention does not adopt the network time protocol to obtain the accurate time instant, so there is no risk of being attacked by the DDoS.

Figure 2A:
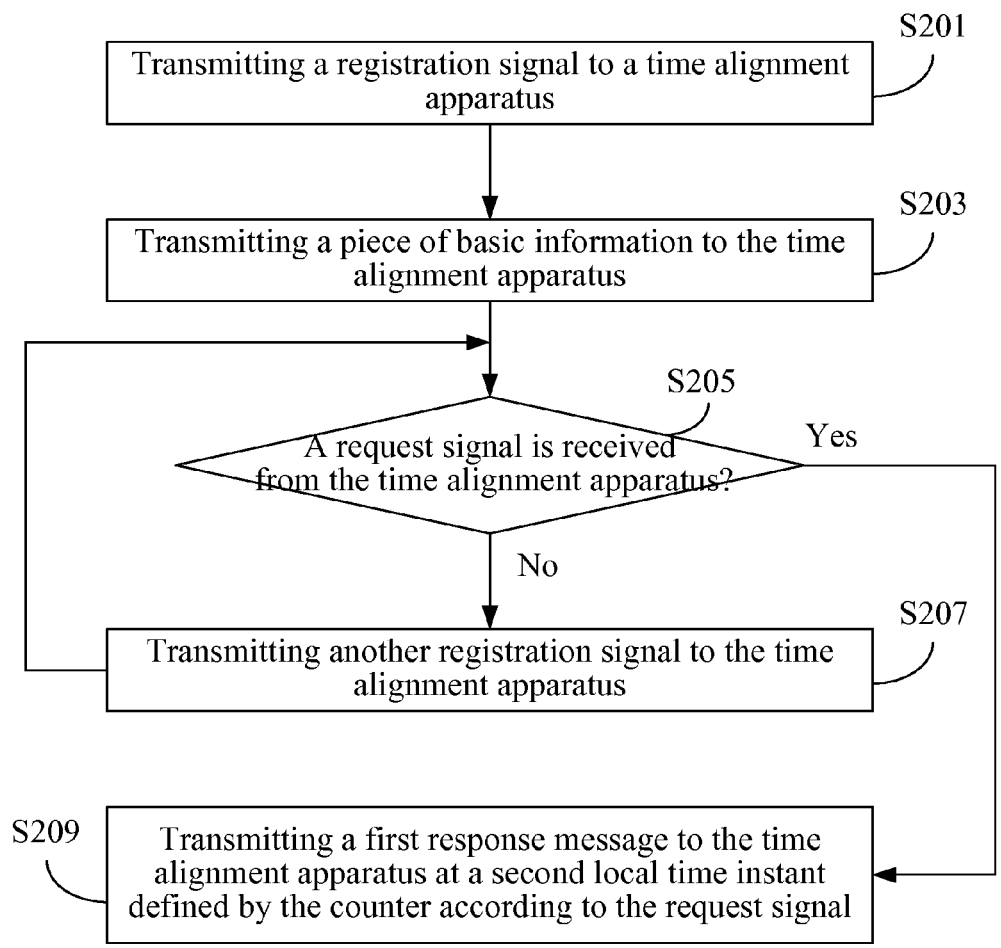
FIG. 2A illustrates the flowchart of a second embodiment.

A second embodiment of the present invention is a time processing method and a flowchart of which is depicted in FIG. 2A. The time processing method is adapted for a sensing apparatus in a sensing network, e.g., the sensing apparatus 13 described in the first embodiment. The sensing apparatus comprises a counter, a transceiving interface, and a sensor.

In this embodiment, the sensor included in the sensing apparatus senses the surrounding environment depending on the setting and/or its characteristics. Briefly speaking, the sensor may obtain the sensed data by sensing the surrounding environment periodically or obtain the sensed data in response to the occurrence of events. For ease of subsequent description, it is assumed that in a certain step (not shown), the sensor begins to sense at least one sensed data at a first local time instant defined by the counter.

According to the time processing method of this embodiment, in step S201, a registration signal is transmitted by the transceiving interface to a time alignment apparatus within the same sensing network in order to register the sensing apparatus to the time alignment apparatus. It shall be appreciated that if the sensing apparatus has already been registered to the time alignment apparatus (e.g., being pre-registered during the procedure of deploying the sensing network) in other embodiments, the step S201 may be omitted. Next, in step S203, a piece of basic information is transmitted by the transceiving interface to the time alignment apparatus, wherein the piece of basic information carries a data transmission quantity, a counter parameter (e.g., the number of bits of the counter), and/or a maximum transmission update frequency. Similarly, in other embodiments, if the time alignment apparatus already has the information of the sensing apparatus (e.g., the data transmission quantity, the parameter of the counter and/or the maximum transmission update frequency), the step S203 may be omitted.

In step S205, it is determined whether the transceiving interface receives a request signal from the time alignment apparatus within a first preset time duration. If the determination result of the step S205 is "No", the sensing apparatus believes that it has been disconnected from the time alignment apparatus. In response to the determination, the time processing method proceeds to step S207 of transmitting another registration signal to the time alignment apparatus by the transceiving interface. Thereafter, the time processing method returns to the step S205.

If the determination result of the step S205 is "Yes", the time processing method proceeds to step S209. In the step S209, a first response message is transmitted by the transceiving interface to the time alignment apparatus at a second local time instant defined by the counter according to the request signal. It shall be appreciated that, in some embodiments, the transceiving interface receives the request signal at a third local time instant defined by the counter, wherein the request signal carries a time offset. In these embodiments, the second local time instant that the first response message is transmitted in the step S209 is decided according to the third local time instant and the time offset. The first response message transmitted in the step S209 carries the at least one sensed data, the first local time instant, and the second local time instant. Therefore, the time alignment apparatus, which has received the first response message, can calculate a global time instant that the at least one sensed data is sensed according to the first local time instant and the second local time instant.

Figure 2B:
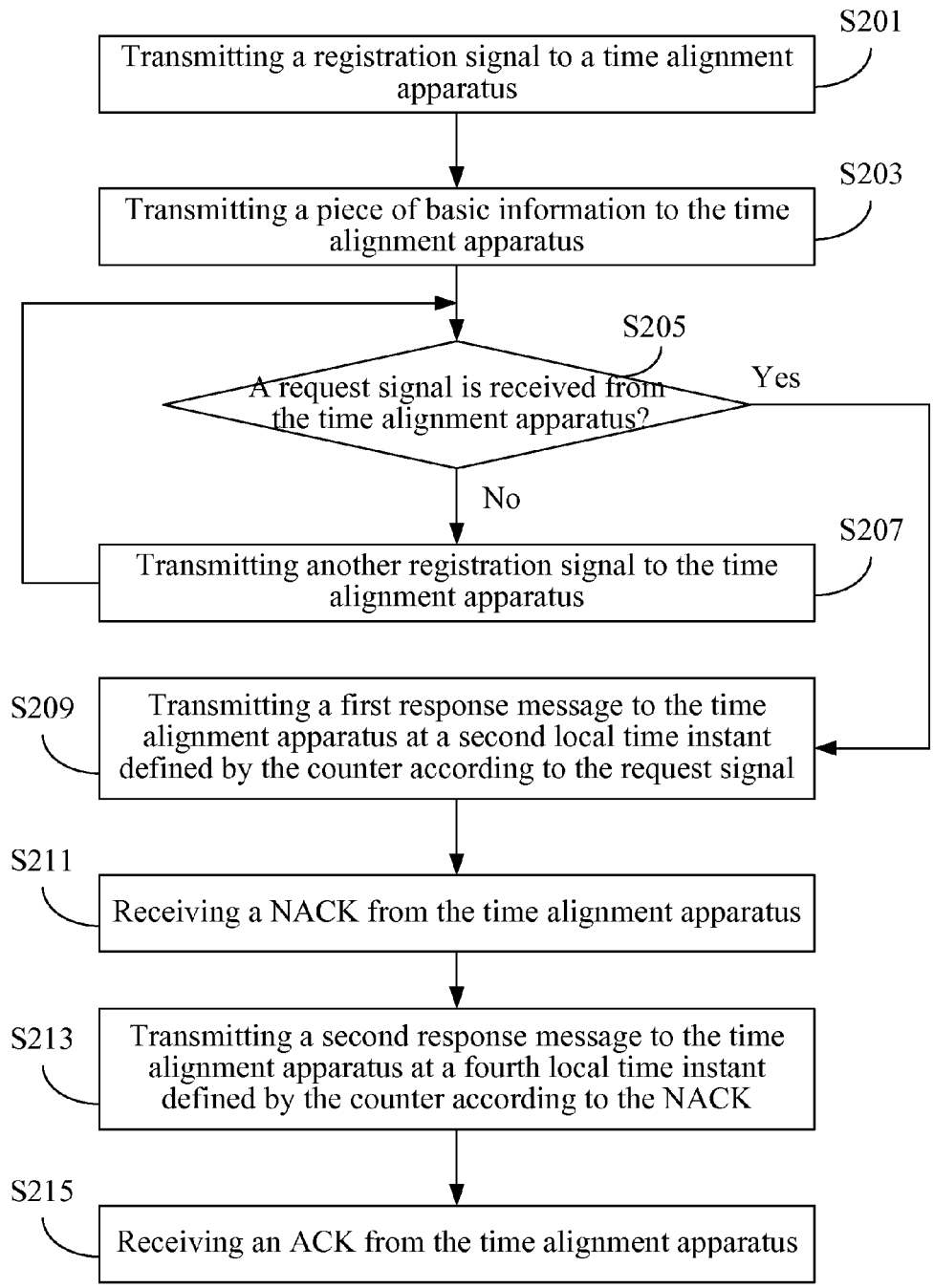
FIG. 2B illustrates the steps executed by the time processing method when dealing with the first kind of data loss and/or collision condition.

In some embodiments, the time processing method further provides a solution for a data loss and/or collision condition. Please refer to FIG. 2B, which illustrates the steps executed by the time processing method when dealing with the first kind of data loss and/or collision condition. After the step S209, the time processing method receives a NACK from the time alignment apparatus (which means that the first response message transmitted in the step S209 is not actually received by the time alignment apparatus) in step S211. In response to the NACK, the time processing method executes step S213 for transmitting, by the transceiving interface, a second response message to the time alignment apparatus at a fourth local time instant defined by the counter according to the NACK.

It shall be appreciated that, in some embodiments, the NACK carries a time offset. In these embodiments, the fourth local time instant that the second response message is transmitted in the step S213 is decided according to the local time instant that the NACK is received by the transceiving interface and the time offset. The second response message transmitted in the step S213 carries the at least one sensed data, the first local time instant, and the fourth local time instant. Therefore, the time alignment apparatus, which has received the second response message, can calculate a global time instant that the at least one sensed data is sensed according to the first local time instant and the fourth local time instant. Afterwards, the time processing method executes step S215 for receiving an ACK, by the transceiving interface, from the time alignment apparatus. Since the sensing apparatus has received the ACK, it means that the second response message transmitted in the step S213 is actually transmitted to the time alignment apparatus.

Figure 2C:
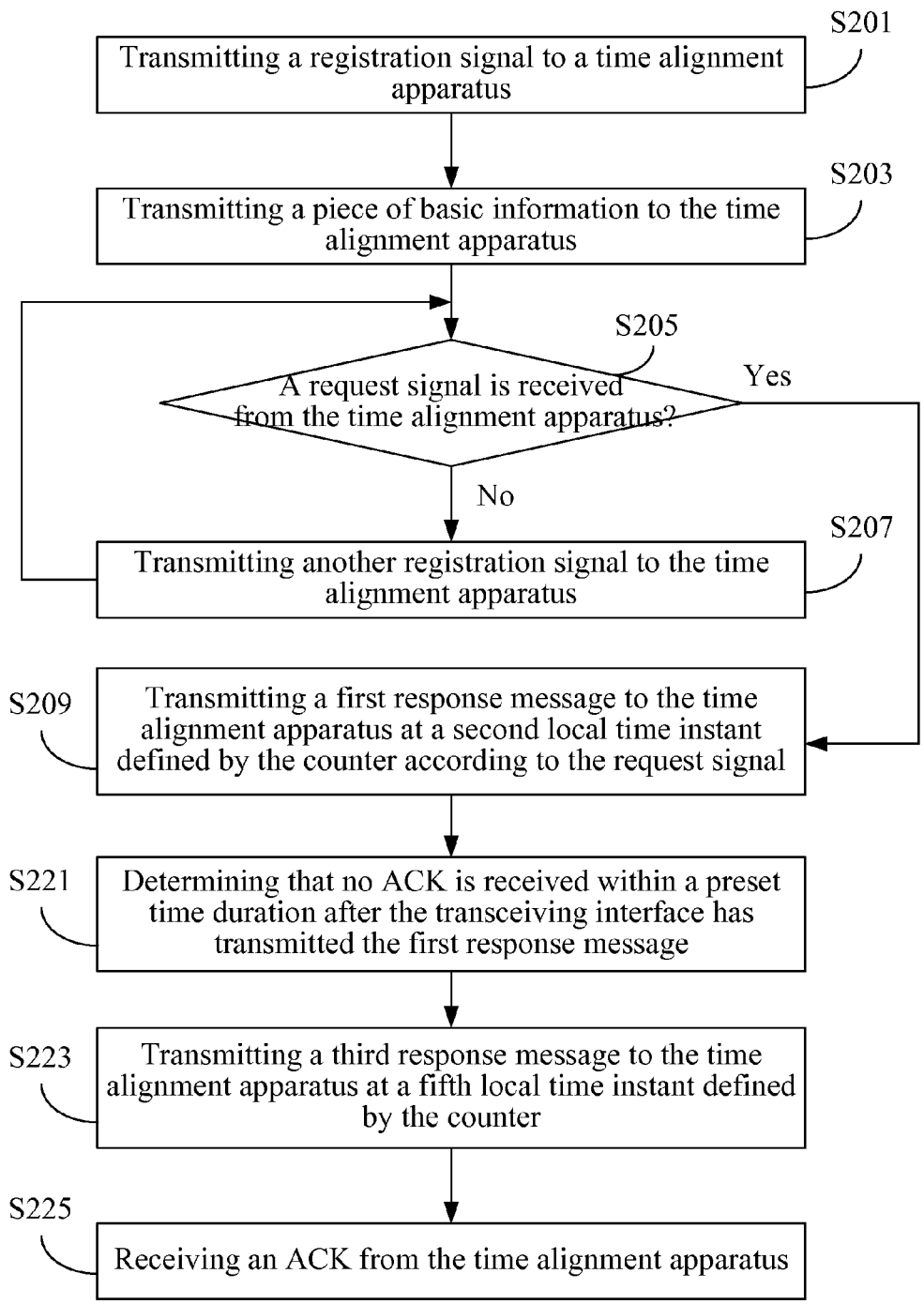
FIG. 2C illustrates the steps executed by the time processing method when dealing with the second kind of data loss and/or collision condition.

Please refer to FIG. 2C, which illustrates the steps executed by the time processing method when dealing with the second kind of data loss and/or collision condition. After the step S209, the time processing method determines that no ACK is received within a second preset time duration after the transceiving interface has transmitted the first response message in step S221. Since no ACK is received by the sensing apparatus, the sensing apparatus believes that the first response message transmitted by the sensing apparatus is not received by the time alignment apparatus. Next, in step S223, a third response message is transmitted by the transceiving interface to the time alignment apparatus at a fifth local time instant defined by the counter. The third response message carries the at least one sensed data, the first local time instant, and the fifth local time instant so that the time alignment apparatus can calculate the global time instant that the at least one sensed data is sensed according to the first local time instant and the fifth local time instant. Thereafter, the time processing method executes step S225 for receiving an ACK by the transceiving interface from the time alignment apparatus. Since the sensing apparatus has received the ACK, it means that the third response message transmitted in the step S223 is actually received by the time alignment apparatus.

In addition to the aforesaid steps, the time processing method of the second embodiment can also execute all the operations and steps of the sensing apparatus 13 set forth in the first embodiment, have the same functions, and deliver the same technical effects as the sensing apparatus 13 of the first embodiment. How the second embodiment executes these operations and steps, have the same functions, and deliver the same technical effects as the first embodiment will be readily appreciated by those of ordinary skill in the art based on the explanation of the first embodiment, and thus will not be further described herein.

A third embodiment of the present invention provides a time alignment method, which is adapted for a time alignment apparatus in a sensing network, e.g., the time alignment apparatus 11 described in the first embodiment. The time alignment apparatus comprises a real-time clock, a transceiving interface, and a processor. The time alignment method of this embodiment may operate in cooperation with the time processing method of the second embodiment.

In step S301, a registration signal is received by the transceiving interface from a sensing apparatus within the same sensing network. It shall be appreciated that if the sensing apparatus has already been registered to the time alignment apparatus (e.g., being pre-registered in building the sensing network) in other embodiments, the step S301 may be omitted. Next, in step S303, a piece of basic information is received by the transceiving interface from the sensing apparatus, wherein the piece of basic information carries a data transmission quantity, a counter parameter (e.g., the number of bits of the counter), and/or a maximum transmission update frequency. Similarly, in other embodiments, if the time alignment apparatus already has the information of the sensing apparatus, e.g., the data transmission quantity, the parameter of the counter and/or the maximum transmission update frequency, the step S303 may be omitted.

In step S305, a request signal is transmitted by the transceiving interface to the sensing apparatus. The request signal is used for requesting the sensing apparatus to transmit the sensed data. It shall be appreciated that, in some embodiments, the step S305 is executed by the processor to decide to transmit the request signal at a global time instant defined by the real-time clock according to the data transmission quantity, the counter parameter, and the transmission update frequency of the sensing apparatus. In step S307, a first response message is received by the transceiving interface from the sensing apparatus at a first global time instant defined by the real-time clock, wherein the first response message carries at least one sensed data, a first local time instant, and a second local time instant. The aforesaid first local time instant is the local time instant that the sensing apparatus senses the at least one sensed data, while the aforesaid second local time instant is the local time instant that the sensing apparatus transmits the first response message.

In step S309, a second global time instant that the at least one sensed data is sensed by the sensing apparatus is calculated by the processor according to a required transmission time between the time alignment apparatus and the sensing apparatus, a clock skew rate between the time alignment apparatus and the sensing apparatus, the first global time instant, the first local time instant, and the second local time instant. For example, the above calculation may be performed by the aforesaid Equation (1).

It shall be appreciated that, in some embodiments, a required transmission time between the time alignment apparatus and the sensing apparatus as well as a clock skew rate between the time alignment apparatus and the sensing apparatus need to be calculated before the step S309 is executed. In these embodiments, the step S305 is executed to transmit the request signal by the transceiving interface at a third global time instant defined by the real-time clock, the sensing apparatus receives the request signal at a third local time instant, and the first response message further carries the third local time instant. In these embodiments, the time alignment method further executes another step (not shown) for calculating the required transmission time between the time alignment apparatus and the sensing apparatus by the processor according to the first global time instant, the third global time instant, the second local time instant, and the third local time instant. For example, the calculation may be performed by the aforesaid Equation (2). Furthermore, the time alignment method further executes another step (not shown) for calculating the clock skew rate between the time alignment apparatus and the sensing apparatus by the processor according to the first global time instant, the third global time instant, the required transmission time, the second local time instant, and the third local time instant. For example, the above calculation may be performed through the aforesaid Equation (3).

Figure 3A:
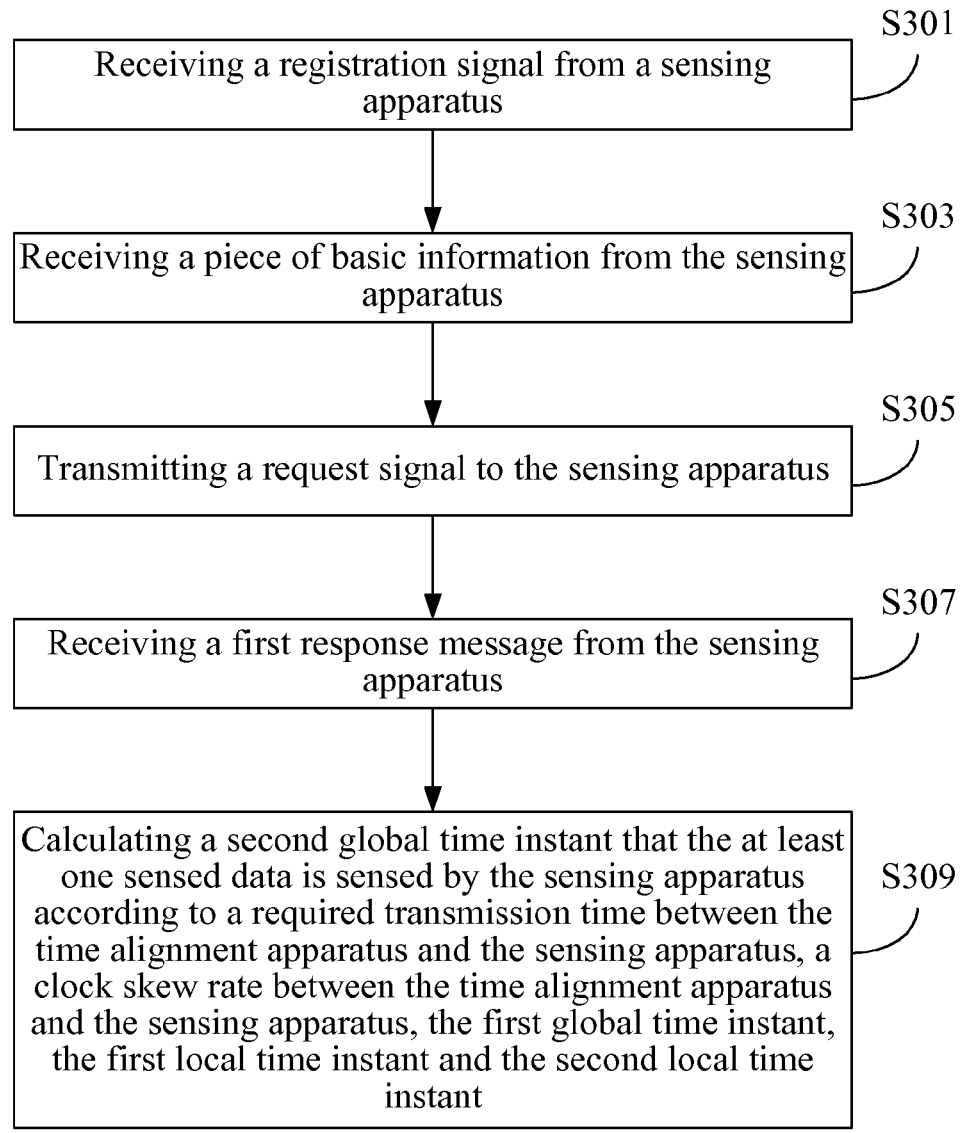
FIG. 3A illustrates a flowchart of a third embodiment.
Figure 3B:
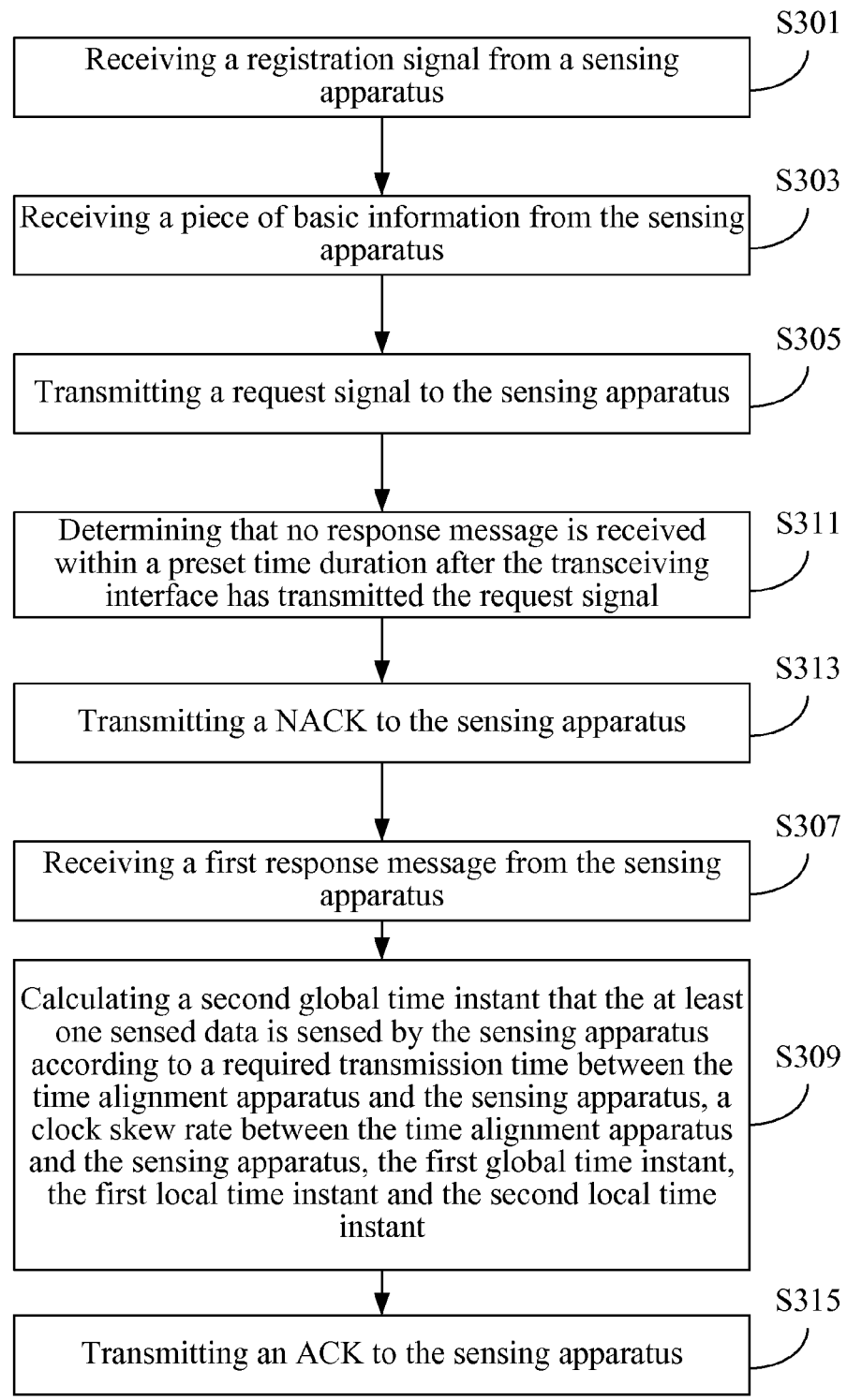
FIG. 3B illustrates the steps executed by the time alignment method when dealing with the first kind of data loss and/or collision condition.

In some embodiments, the time alignment method further provides a solution for a data loss and/or collision condition. Please refer to FIG. 3B, which illustrates the steps executed by the time alignment method when dealing with the first kind of data loss and/or collision condition. The steps shown FIG. 3B are for dealing with the situation that the first response message transmitted by the sensing apparatus is not actually received by the time alignment apparatus. In this case, the time alignment method further executes step S311 for determining that no response message is received within a first preset time duration after the transceiving interface has transmitted the request signal after the step S305.

Thereafter, in step S313, a NACK is transmitted by the transceiving interface to the sensing apparatus. Next, the aforesaid steps S307 and S309 are executed again by the time alignment method. Moreover, the time alignment method executes step S315 for transmitting an ACK by the transceiving interface to the sensing apparatus to inform the sensing apparatus that the response message has been received. It shall be appreciated that the step S315 is only required to be executed within a preset time duration after the step S307 is executed. In other words, in some embodiments, the step S315 may be executed before the step S309.

Figure 3C:
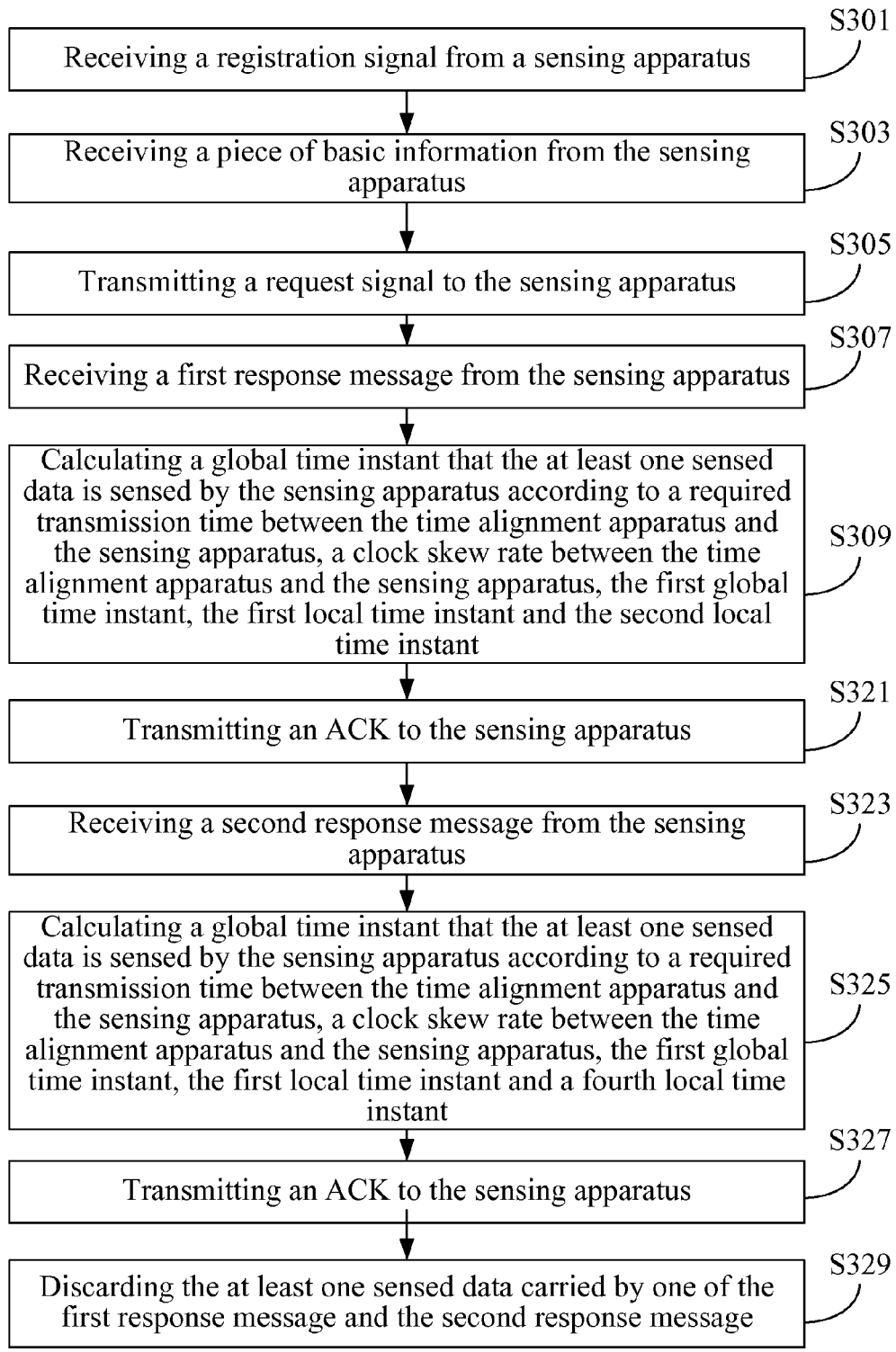
FIG. 3C illustrates the steps executed by the time alignment method when dealing with the second kind of data loss and/or collision condition.

Please refer to FIG. 3C, which illustrates the steps executed by the time alignment method when dealing with the second kind of data loss and/or collision condition. The steps shown in FIG. 3C are for dealing with the situation that the ACK transmitted by the time alignment apparatus after receiving the first response message is not actually received by the sensing apparatus. When this situation happens, the sensing apparatus mistakenly believes that the first response message that it transmits is not received by the time alignment apparatus.

Specifically, the time alignment method executes step S321 for transmitting an ACK by the transceiving interface to the sensing apparatus after the step S309. It shall be appreciated that the step S321 only needs to be executed within a preset time duration after the step S307 is executed. In other words, in some embodiments, the step S321 may be executed before the step S309. The ACK transmitted in the step S321 is not received by the sensing apparatus. In step S323, a second response message is received by the transceiving interface from the sensing apparatus, wherein the second response message carries at least one sensed data, the first local time instant, and a fourth local time instant, wherein the fourth local time instant is the local time instant that the sensing apparatus transmits the second response message. Thereafter, in step S325, the second global time instant that the at least one sensed data is sensed by the sensing apparatus is calculated by the processor according to a required transmission time between the time alignment apparatus and the sensing apparatus, a clock skew rate between the time alignment apparatus and the sensing apparatus, the first global time instant, the first local time instant, and the fourth local time instant.

In step S327, an ACK is transmitted by the transceiving interface to the sensing apparatus. It shall be appreciated that the step S327 only needs to be executed within a preset time duration after the step S323 is executed. In other words, in some embodiments, the step S327 may be executed before the step S325. In step S329, it is determined by the processor that the at least one sensed data carried by the first response message is the same as the at least one sensed data carried by the second response message and, thus, one of the at least one sensed data is discarded.

In addition to the aforesaid steps, the time alignment method of the third embodiment can also execute all the operations and steps of the time alignment apparatus 11 set forth in the first embodiment, have the same functions, and deliver the same technical effects as the time alignment apparatus 11 of the first embodiment. How the third embodiment executes these operations and steps, have the same functions, and deliver the same technical effects as the first embodiment will be readily appreciated by those of ordinary skill in the art based on the explanation of the first embodiment and, thus, will not be further described herein.

It shall be appreciated that, in the present patent specification and the claims, the terms "first," "second," and "third" in "the first preset time duration," "the second preset time duration," and "the third preset time duration" are only used to indicate that these preset time durations are different preset time durations. Similarly, the terms "first," "second," "third," "fourth," and "fifth" in "the first local time instant," "the second local time instant," "the third local time instant," "the fourth local time instant," and "the fifth local time instant" are only used to indicate that these local time instants are different local time instants. The terms "first," "second," and "third" in "the first global time instant," "the second global time instant," and "the third global time instant" are only used to indicate that these global time instants are different global time instants. The terms "first," "second," and "third" in "the first response message," "the second response message," and "the third response message" are only used to indicate that these response messages are different response messages.

According to the above descriptions, through the technology provided in the present invention, the time alignment apparatus in the sensing network can schedule according to the basic information of the sensing apparatus. After receiving a request signal transmitted by the time alignment apparatus, the sensing apparatus transmits at least the following information in response: (a) at least one sensed data that is sensed previously, (b) the local time instant that the sensing apparatus begins to sense the at least one sensed data, and (c) the local time instant that the sensing apparatus transmits the response message. After obtaining the information transmitted from the sensing apparatus, the time alignment apparatus needs to align the local time instant (the time instant recognizable by the sensing apparatus) that the at least one sensed data is sensed into a global time instant (the time instant recognizable by the time alignment apparatus). Specifically, the time alignment apparatus aligns the time of the at least one sensed data according to the following information: (a) a required transmission time between the time alignment apparatus and the sensing apparatus, (b) a clock skew rate between the time alignment apparatus and the sensing apparatus, (c) the global time instant that the response message is received by the time alignment apparatus, (d) the local time instant that the sensing apparatus begins to sense the at least one sensed data, and (e) the local time instant that the sensing apparatus transmits the response message.

The aforesaid local time instant is defined by the counter included in the sensing apparatus. The cost of the counter is much lower than that of the GPS module and the time synchronization chip used in the conventional technology. In addition, the volume of the counter is much smaller than that of the GPS module and the time synchronization chip used in the conventional technology. Hence, deploying the sensing apparatus of the sensing network will not be a burden to the users. Moreover, the technology provided in the present invention does not adopt the network time protocol to obtain the accurate time instant, so there is no risk of being attacked by the DDoS.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A sensing apparatus, comprising:
   a counter;
   a transceiving interface, being configured to receive a request signal from a time alignment apparatus; and
   a sensor, being configured to begin to sense at least one sensed data at a first local time instant defined by the counter;
   wherein the transceiving interface further transmits a first response message to the time alignment apparatus at a second local time instant defined by the counter and the first response message carries the at least one sensed data, the first local time instant, and the second local time instant so that the time alignment apparatus calculates a global time instant that the at least one sensed data is sensed according to the first local time instant and the second local time instant.

2. The sensing apparatus of claim 1, wherein the transceiving interface receives the request signal at a third local time instant defined by the counter and the first response message further carries the third local time instant.

3. The sensing apparatus of claim 1, wherein the transceiving interface receives the request signal at a third local time instant defined by the counter, the request signal carries a time offset, and the transceiving interface transmits the first response message to the time alignment apparatus at the second local time instant according to the third local time instant and the time offset.

4. The sensing apparatus of claim 1, wherein the transceiving interface further transmits a piece of basic information of the sensing apparatus to the time alignment apparatus and the piece of basic information carries a data transmission quantity, a counter parameter, and a transmission update frequency.

5. The sensing apparatus of claim 1, wherein the transceiving interface further receives a Negative-Acknowledgment (NACK) from the time alignment apparatus, the transceiving interface further transmits a second response message to the time alignment apparatus at a third local time instant defined by the counter according to the NACK, and the second response message carries the at least one sensed data, the first local time instant, and the third local time instant so that the time alignment apparatus calculates the global time instant that the at least one sensed data is sensed according to the first local time instant and the third local time instant.

6. The sensing apparatus of claim 1, wherein an Acknowledgment (ACK) is not received within a preset time duration after the transceiving interface has transmitted the first response message, the transceiving interface further transmits a second response message to the time alignment apparatus at a third local time instant defined by the counter, and the second response message carries the at least one sensed data, the first local time instant, and the third local time instant so that the time alignment apparatus calculates the global time instant that the at least one sensed data is sensed according to the first local time instant and the third local time instant.

7. A time alignment apparatus, comprising:
   a real-time clock;
   a transceiving interface, being configured to transmit a request signal to a sensing apparatus and receive a first response message from the sensing apparatus at a first global time instant defined by the real-time clock, the first response message carrying at least one sensed data, a first local time instant, and a second local time instant, wherein the sensing apparatus senses the at least one sensed data at the first local time instant and the sensing apparatus transmits the first response message at the second local time instant; and a processor, being electrically connected to the transceiving interface and configured to calculate a second global time instant that the at least one sensed data is sensed by the sensing apparatus according to a required transmission time between the time alignment apparatus and the sensing apparatus, a clock skew rate between the time alignment apparatus and the sensing apparatus, the first global time instant, the first local time instant, and the second local time instant.

8. The time alignment apparatus of claim 7, wherein the transceiving interface transmits the request signal at a third global time instant defined by the real-time clock, the sensing apparatus receives the request signal at a third local time instant, the first response message further carries the third local time instant, and the processor further calculates the required transmission time between the time alignment apparatus and the sensing apparatus according to the first global time instant, the third global time instant, the second local time instant, and the third local time instant.

9. The time alignment apparatus of claim 7, wherein the transceiving interface transmits the request signal at a third global time instant defined by the real-time clock, the sensing apparatus receives the request signal at a third local time instant, the first response message further carries the third local time instant, and the processor further calculates the clock skew rate between the time alignment apparatus and the sensing apparatus according to the first global time instant, the third global time instant, the required transmission time, the second local time instant and the third local time instant.

10. The time alignment apparatus of claim 7, wherein the transceiving interface further receives a piece of basic information from the sensing apparatus, the piece of basic information carries a data transmission quantity, a counter parameter, and a transmission update frequency, and the processor further decides to transmit the request signal at a third global time instant defined by the real-time clock according to the data transmission quantity, the counter parameter, and the transmission update frequency.

11. The time alignment apparatus of claim 7, wherein no response message is received within a preset time duration after the transceiving interface has transmitted the request signal, the transceiving interface further transmits a NACK to the sensing apparatus, and the transceiving interface receives the first response message after transmitting the NACK.

12. The time alignment apparatus of claim 7, wherein the transceiving interface further transmits an ACK after receiving the first response message, the transceiving interface further receives a second response message from the sensing apparatus at a third global time instant defined by the real-time clock, the second response message carries at least one sensed data, the first local time instant, and a third local time instant, the processor further determines that the at least one sensed data carried by the second response message is the same as the at least one sensed data carried by the first response message, and the processor further discards the at least one sensed data carried by one of the first response message and the second response message.

13. A time processing method, being adapted for a sensing apparatus, the sensing apparatus comprising a counter, a transceiving interface, and a sensor, the time processing method comprising:

(a) receiving, by the transceiving interface, a request signal from a time alignment apparatus;

(b) beginning to sense, by the sensor, at least one sensed data at a first local time instant defined by the counter; and (c) transmitting, by the transceiving interface, a first response message to the time alignment apparatus at a second local time instant defined by the counter;

wherein the first response message carries the at least one sensed data, the first local time instant, and the second local time instant so that the time alignment apparatus calculates a global time instant that the at least one sensed data is sensed according to the first local time instant and the second local time instant.

14. The time processing method of claim 13, wherein the step (a) receives the request signal by the transceiving interface at a third local time instant defined by the counter and the first response message further carries the third local time instant.

15. The time processing method of claim 13, wherein the step (a) receives the request signal by the transceiving interface at a third local time instant defined by the counter, the request signal carries a time offset, and the step (c) transmits the first response message to the time alignment apparatus by the transceiving interface according to the third local time instant and the time offset.

16. The time processing method of claim 13, further comprising:

transmitting, by the transceiving interface, a piece of basic information of the sensing apparatus to the time alignment apparatus;

wherein the piece of basic information carries a data transmission quantity, a counter parameter, and a transmission update frequency.

17. The time processing method of claim 13, further comprising:

receiving, by the transceiving interface, a NACK from the time alignment apparatus; and transmitting, by the transceiving interface, a second response message to the time alignment apparatus at a third local time instant defined by the counter according to the NACK;

wherein the second response message carries the at least one sensed data, the first local time instant, and the third local time instant so that the time alignment apparatus calculates the global time instant that the at least one sensed data is sensed according to the first local time instant and the third local time instant.

18. The time processing method of claim 13, further comprising:

determining that an ACK is not received within a preset time duration after the transceiving interface has transmitted the first response message; and transmitting, by the transceiving interface, a second response message to the time alignment apparatus at a third local time instant defined by the counter;

wherein the second response message carries the at least one sensed data, the first local time instant, and the third local time instant so that the time alignment apparatus calculates the global time instant that the at least one sensed data is sensed according to the first local time instant and the third local time instant.

19. A time alignment method, being adapted for a time alignment apparatus, the time alignment apparatus comprising a real-time clock, a transceiving interface, and a processor, the time alignment method comprising:

(a) transmitting, by the transceiving interface, a request signal to a sensing apparatus;
(b) receiving, by the transceiving interface, a first response message from the sensing apparatus at a first global time instant defined by the real-time clock, wherein the first response message carries at least one sensed data, a first local time instant, and a second local time instant, the sensing apparatus senses the at least one sensed data at the first local time instant, and the sensing apparatus transmits the first response message at the second local time instant; and
(c) calculating, by the processor, a second global time instant that the at least one sensed data is sensed by the sensing apparatus according to a required transmission time between the time alignment apparatus and the sensing apparatus, a clock skew rate between the time alignment apparatus and the sensing apparatus, the first global time instant, the first local time instant, and the second local time instant.

20. The time alignment method of claim 19, wherein the step (a) transmits the request signal at a third global time instant defined by the real-time clock, the sensing apparatus receives the request signal at a third local time instant, the first response message further carries the third local time instant, and the time alignment method further comprises:
calculating, by the processor, the required transmission time between the time alignment apparatus and the sensing apparatus according to the first global time instant, the third global time instant, the second local time instant, and the third local time instant.

21. The time alignment method of claim 19, wherein the step (a) transmits the request signal at a third global time instant defined by the real-time clock, the sensing apparatus receives the request signal at a third local time instant, the first response message further carries the third local time instant, and the time alignment method further comprises:
calculating, by the processor, the clock skew rate between the time alignment apparatus and the sensing apparatus according to the first global time instant, the third global time instant, the required transmission time, the second local time instant, and the third local time instant.

22. The time alignment method of claim 19, further comprising:
receiving, by the transceiving interface, a piece of basic information from the sensing apparatus, wherein the piece of basic information carries a data transmission quantity, a counter parameter, and a transmission update frequency; and
deciding, by the processor, to transmit the request signal at a third global time instant defined by the real-time clock according to the data transmission quantity, the counter parameter, and the transmission update frequency.

23. The time alignment method of claim 19, further comprising:
determining that no response message is received within a preset time duration after the transceiving interface has transmitted the request signal; and
transmitting, by the transceiving interface, a NACK to the sensing apparatus;
wherein the step (b) receives the first response message after the transceiving interface has transmitted the NACK.

24. The time alignment method of claim 19, further comprising:
transmitting, by the transceiving interface, an ACK after the first response message is received;
receiving, by the transceiving interface, a second response message from the sensing apparatus at a third global time instant defined by the real-time clock, wherein the second response message carries at least one sensed data, the first local time instant, and a third local time instant;
determining, by the processor, that the at least one sensed data carried by the second response message is the same as the at least one sensed data carried by the first response message; and
discarding, by the processor, the at least one sensed data carried by one of the first response message and the second response message.

\* \* \* \* \*